Feb. 15, 1938.  P. JEPSON  2,108,535
PEACH TREATING MACHINE
Filed March 11, 1936   3 Sheets-Sheet 1

Inventor
Percy Jepson
By Lyon & Lyon
Attorneys

Feb. 15, 1938.    P. JEPSON    2,108,535
PEACH TREATING MACHINE
Filed March 11, 1936    3 Sheets-Sheet 3

Inventor
Percy Jepson
By Lyon&Lyon
Attorneys

Patented Feb. 15, 1938

2,108,535

UNITED STATES PATENT OFFICE 2,108,535

PEACH TREATING MACHINE

Percy Jepson, San Jose, Calif., assignor to Pacific Machinery Company, San Jose, Calif., a corporation of California Application March 11, 1936, Serial No. 68,160

5 Claims. (Cl. 146—28)

This invention relates to a peach treating machine and is an improvement of the invention set forth in my copending application Serial Number 715,052, filed March 12, 1934, and which has now matured into a patent, No. 2,066,567.

Among the principal objects of this invention are the provisions of means for the automatic positioning of the peaches in splitting position; the provision of a pit engaging stop for properly locating the fruit with relation to the splitting knives; the provision of stop means for locating peaches having split pits in proper splitting position; the provision of appropriately shaped splitting knives for correctly orienting the pit of the fruit during the splitting operation; the provision of double acting pitting means and the provision of means for trimming a finishing slice from the pitted half peach.

Other objects and advantages of the invention will become apparent as the nature of the same is more fully understood from the following description and accompanying drawings, wherein is set forth what is now considered to be a preferred embodiment. It should be understood, however, that the particular embodiment of the invention is chosen principally for the purpose of exemplification and that variations therefrom in details of construction or arrangement of parts may accordingly be effected and yet remain within the spirit and scope of the invention as the same is set forth in the appended claims.

Figure 5:
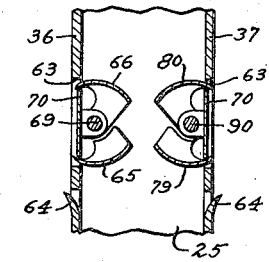
Figure 6:
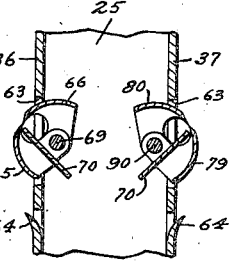
Figure 7:
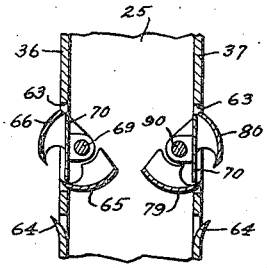

Figures 5, 6, and 7 illustrate different operating positions of the pitting knives.

Figure 1:
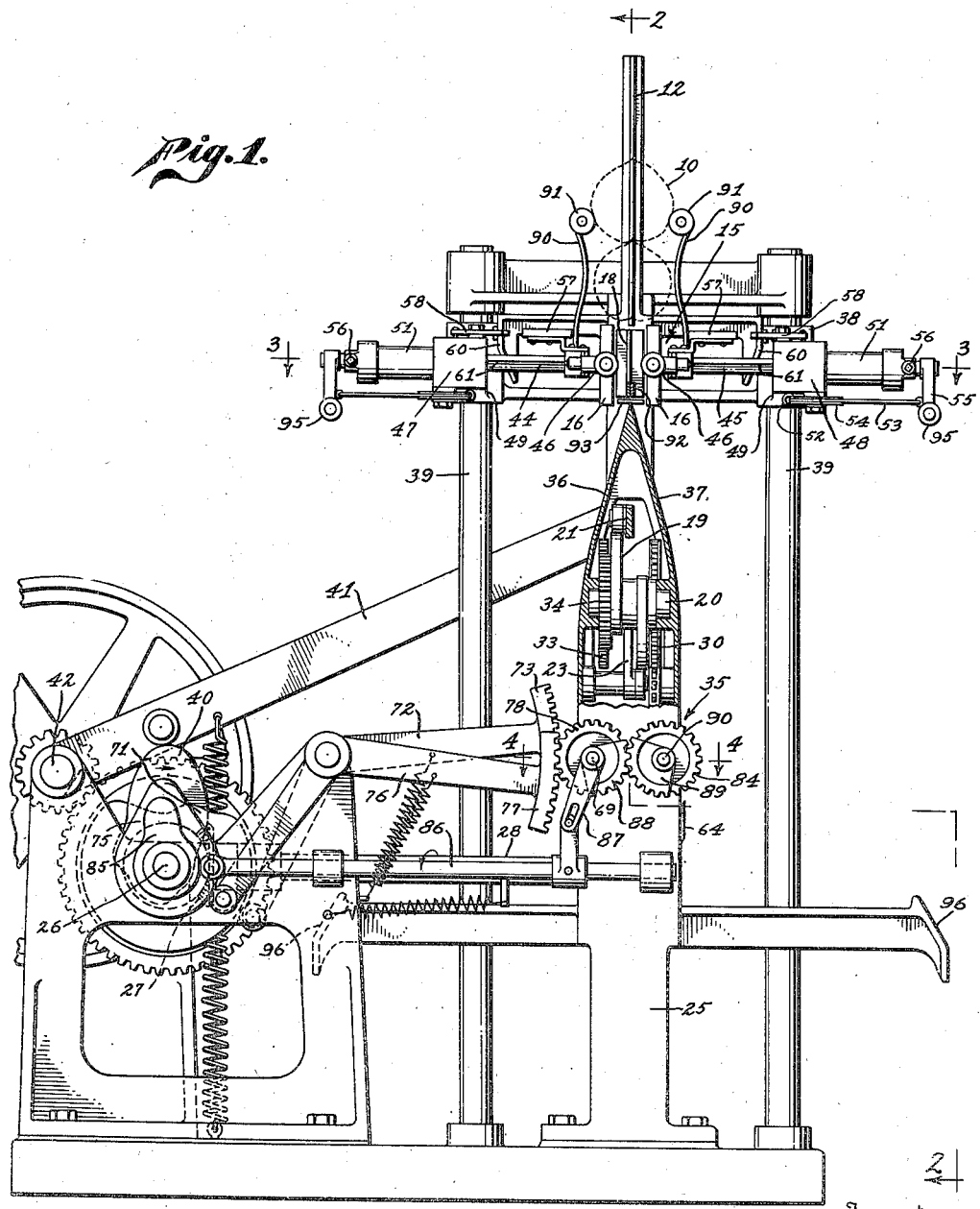
Figure 1 illustrates a sectional view of the machine taken substantially in the plane of line 1—1 of Fig. 2.

In the preferred embodiment of the machine of this invention peaches 10 are impaled upon a pair of spaced coplanar blades. The front impaling blade 11 is preferably made shorter than the rear blade 12 in order to facilitate in the feeding of the peaches. As illustrated in Figure 1, the impaling blades are appropriately mounted upon the upper portion of the machine frame 13 and are spaced apart sufficiently to permit the pits of the peaches to pass between them.

These blades form a peach receiving magazine and, as shown in Figure 1, the peaches are serially impaled thereon by the operator.

From the magazine the peaches are mechanically fed, in a manner later to be described, to a splitting or receiving station 14.

Figure 2:
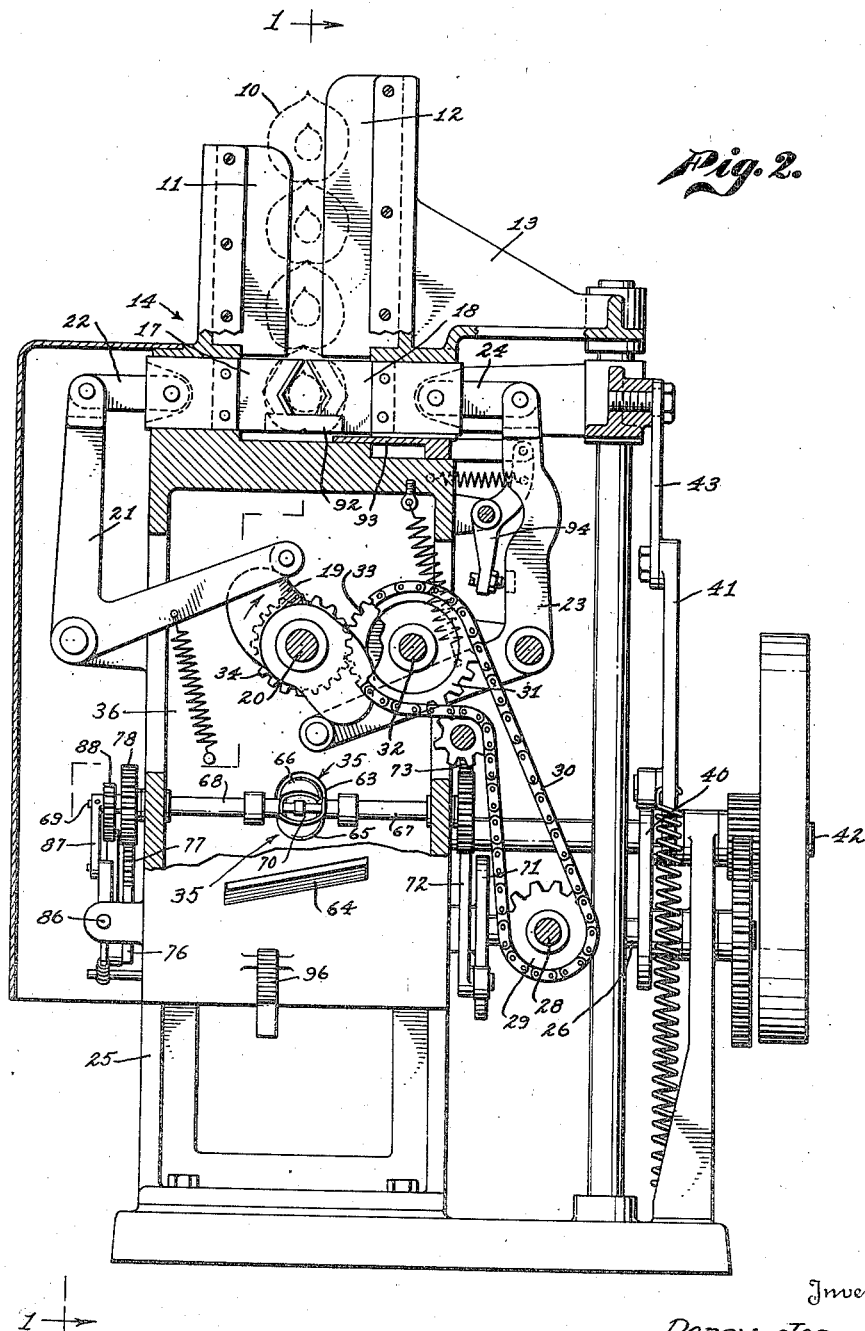
Figure 2 illustrates a sectional view taken substantially in the plane of line 2—2 of Fig. 1.

At this station peach conveying means 15, comprising pivotally mounted peach engaging rings 16 of the type shown in my copending application previously referred to, are brought into engagement with the peach and hold the peach momentarily while the cutter blades 17 and 18 act to cut the held peach into halves. The cutter blades are reciprocally mounted in the frame just below and in substantial alignment with the impaling blades. In Figure 2 the cutter blades are shown as having oppositely disposed V shaped notches. The purpose of this construction is to correctly orient the peaches automatically so that the stem and blossom ends of the peaches will be vertically aligned in case the operator inadvertently mounts the peaches upon the impaling blades out of this desired alignment. Also it might happen that a peach will cling more tenaciously to one of the impaling blades than the other, or from some other cause turn out of proper alignment, in which case the notches of the cutter blades will return the peaches to their correct alignment. Figure 2 has been taken just after the machine has started upon an operating cycle to show the V shaped notches of the cutter blades engaging and centering one of the peaches. The inactive position of these blades is shown by broken lines in this figure.

Any suitable means may be provided for actuating the cutter blades. As shown, these means may include a double lobed cam 19 securely fastened upon cam shaft 20. The motion derived from this cam is transmitted to the cutter blade 17 by a spring weighted bell crank lever 21 and a connecting rod 22 and to the cutter blade 18 by the spring weighted bell crank lever 23 and connecting rod 24. The cam shaft 20 is suitably journaled in the central standard 25 and is driven in timed relation from the main drive shaft 26 through a set of bevel gears 27 (Fig. 1), shaft 28 (Figs. 1 and 2), sprocket 29, chain 30, sprocket 31, to shaft 32, and finally through gears 33 and 34.

Upon the completion of the cutting operation, the two peach-halves are conveyed by the conveying means to the pitting station 35 (Fig. 2). The travel of the peach-halves is along the spreader plates 36 and 37 (Fig. 1) securely fastened upon the central standard 25.

Any appropriate form of conveying means may be employed. A preferred form of such means may include a reciprocatory crosshead 38 slidably mounted upon guide bars 39. This crosshead may be reciprocated by a properly shaped cam 40 fastened upon the main drive shaft 26 and arranged to actuate the lever arm 41 in timed relation to the other operating elements of the machine. One end of the lever arm is journaled upon the power shaft 42 while its other end is connected to the crosshead by link 43 (Fig. 2). Through this construction each revolution of the main drive shaft 26 will cause the crosshead 38 to reciprocate through one complete cycle. The cam 40 is appropriately shaped to cause the crosshead to go and stop as required during each operating cycle.

The crosshead carries the peach engaging rings 16 and this portion of the machine is substantially like that of my above mentioned patent and, briefly, includes a pair of oppositely disposed rings 16 connected to their respective supporting plungers 44 and 45 by gimbal bearings 46. The plungers are slidably carried by bearings 47 and 48 formed upon outwardly extending crosshead arms 49.

A piston 50 is carried intermediate the ends of each plunger, and is arranged to act in a dash pot cylinder 51. The cylinders are carried by the cross-head bearings and are closed at each end excepting for a suitable bore through which the plunger rod slides. The dash pot acts to retard the inward motion of the rings when released to engage a peach at the receiving station and thus prevents the fruit from being injured. Each ring plunger is urged inwardly by suitable spring means 52 acting through a cable 53 which passes around sheave 54 and is fastened to the stop collar 55, which is in turn securely fastened to the outer end of the plunger. As will be appreciated by this construction, spring 52 will continuously urge the plunger toward the fruit and in case the machine is operated without a peach being in position to be engaged by the ring 16, the stop collars will act to prevent the ring from moving into such close proximity with other parts of the machine as to cause interference.

Each of the dash pot cylinders is provided with a control valve 56 to control the rate of inward travel of the plunger under action of spring 52 when released at the receiving station.

At the end of the downward stroke of the conveyor, the engaging ring plungers are positively moved to their separated position and locked in this position by any suitable means until the conveyor has returned to the receiving station, whereat the holding means are released.

Figure 3:
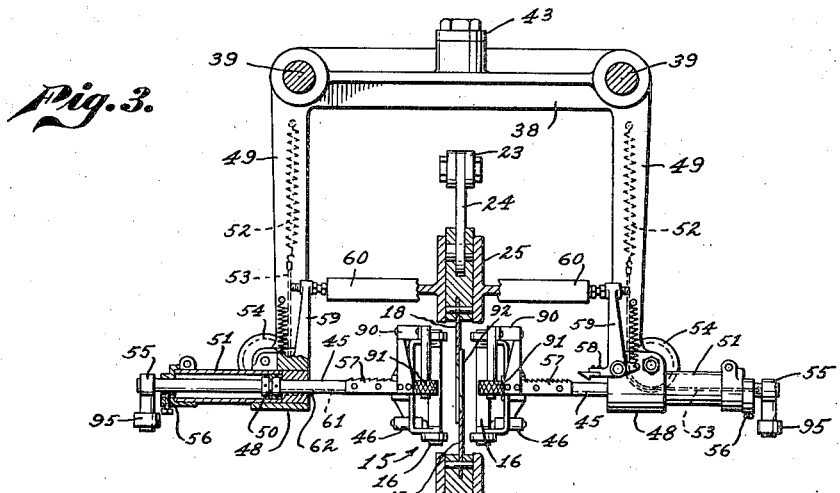
Figure 3 illustrates a sectional view taken substantially in the plane of line 3—3 of Fig. 1.
Figure 4:
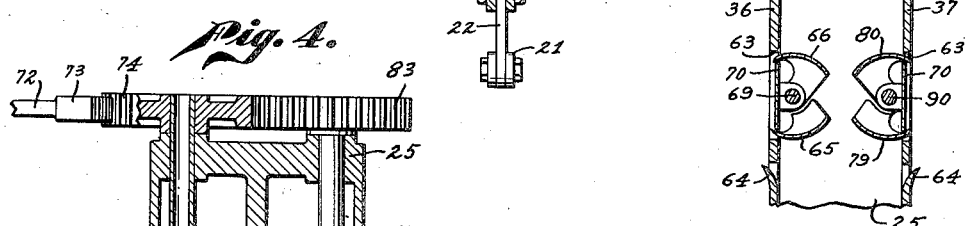
Figure 4 illustrates an enlarged fragmental sectional view taken in the plane of line 4—4 of Fig. 1.

The holding means may include mounting upon each plunger a ratchet bar 57 and providing a cooperating spring weighted pawl 58 upon each crosshead bearing, as is clearly shown in Figure 3. As the conveyor moves into the receiving station, the arms 59 of pawls 58 strike stop members 60 and actuate the pawls against their springs to release the plunger ratchet bars, thus permitting the fruit engaging rings to move into engagement with the peach and it is at about this time that the cutter blades are brought into action to shear the peach in half.

It is desirable to provide means for locking the engaging ring plungers against rotation and for this purpose each plunger is provided with a keyway 61 and each plunger bearing with a key 62.

After the peach has been bisected, the conveyor means is brought into action and slides each peach half along its respective spreader plate (36—37) until these peach halves are moved into register with the pitting apertures 63 at the pitting station 35. At this point the conveyor stops until the pitting operation has been completed, whereupon the pitted peach-halves are conveyed across the trimming blade 64. This trimming blade may be mounted upon each spreader plate or formed integral therewith, as shown in Figures 5, 6 and 7. The provision for the trimming is important as it cuts away the more or less fibrous portion of the peach which is located in the plane of its seam or suture and also trims off any irregularities left by the pitting knives.

It will be understood that any form or type of pitting knives may be used, however, I prefer the form shown herein which includes a double knife structure for cutting the half pits from each peach-half. In Figures 4 to 7 inclusive, this form of pitting means is shown and each pitting unit may include a pair of cooperating pitting knives or spoons 65 and 66 which act more or less like a clam shell dredger bucket in scooping out the half pits.

As the two pitting structures are alike, one only will be described. Referring to Figures 4 to 7, it may be noted that opposite the pitting aperture are mounted the two cooperating pitting knives 65 and 66. The pitting knife 65 is fastened upon the end of a sleeve 67 which is journaled in suitable bearings mounted upon the rear face of the spreader plate 36, while the pitting knife 66 is fastened upon sleeve 68, likewise journaled upon the rear face of this spreader plate. Extending through sleeve 68 and for a short distance into sleeve 67 is the ejector plate rock shaft 69, which carries the ejector plate 70 which is positioned upon the shaft opposite the pitting aperture and within the circle formed by the pitting knives, as is clearly shown in Figures 4 to 7, inclusive. The pitting knives are normally maintained in separated relation, as shown in Figure 5, but may be actuated by suitable driving means to first rotate to a position as shown in Figure 6 and then finally, prior to returning to their open position, to a position as shown in Figure 7. This peculiar action gives a cleaner and more positive pitting action.

Any suitable means may be provided for so actuating the pitting knives. I prefer to use a cam action whereby the particular motion of the knives may be easily controlled. The driving means for the upper pitting knife 65 may include a pitter cam 71 mounted upon the main drive shaft 26 and arranged to act through a spring weighted bell crank lever 72, through a gear segment 73 carried by the free end of this lever for turning the pitting knife driving pinion 74 (Fig. 4) which is fastened to the outer end of the pitting knife sleeve 67 while the lower pitting knife 66 may be actuated from cam 75, spring weighted bell crank lever 76, bell crank gear segment 77, gear 78 fixed upon the knife sleeve 68. This structure makes a simple and positive driving means for the pitting knives, supported by plate 36; and to drive the other set of knives 79 and 80 the sleeves 81 and 83, which carry these knives, are provided with gears 83 and 84 which mesh with gears 74—78.

As soon as the pitting knives have freed the pit from the peach halves, the ejector plate is actuated to remove the pit from the knives. The ejector is preferably actuated by the ejector cam 85, carried by the main drive shaft 26, which acts through a spring weighted push rod 86, and crank arm 87, which arm is fastened upon the end of the ejector rock shaft. The crank arm 87 is provided with a gear segment 88 meshing with a similar gear segment 89 fastened upon the ejector rock shaft 90 of the second pitting means and in this way the ejector for the second set of pitting knives is actuated.

In operation the operator keeps the magazine filled with peaches. The conveyor engages the peach located at the receiving station just prior to the action of the cutter blades and after the peach has been bisected moves each half into register with the pitting means.

It is desirable to provide the conveyor with means for advancing the succeeding peach to the receiving station as the bisected peach is being conveyed through the machine and for this purpose I provide each engaging ring plunger with an upstanding spring arm 90 (Fig. 1) carrying a peach engaging member 91. The arm is made of such length as to position member 91 just above the succeeding peach and when the plungers move inwardly for engagement of the peach the members are brought into engagement with the upper surface of the succeeding peach, as shown in Figure 1. The downward movement of the conveyor carries the engaging member 91 also downwardly and in this way the succeeding peach is moved into the receiving station. It is necessary to provide means for stopping this peach when it moves into the receiving station and I provide two separate means for this purpose. The first means may be referred to as the pit stop and is provided by extending a portion 92 (Fig. 2) of one or both cutter blades across the path traveled by the pit whereby when the pit strikes this portion of the blade further downward movement will be prevented and the spring arms 90 will give to enable the engaging members to slide over the surface of the peach. This feature has one very important advantage in that the peach is located relative to the position of its pit irrespective of its outside shape and, therefore, a more accurate register of the pit with the pitting aperture may be had. It sometimes happens, however, that the peach under treatment is of the split pit variety and therefore might not be stopped by the portion 92.

To provide means for stopping split pit peaches, the second form of stop means is provided which may include a retractable stop plate 93 (Fig. 2) which is moved into the path of the succeeding peach just as the bisected peach is moved past and provides a surface against which the stem end of the succeeding peach will contact to thereby correctly locate it in the receiving station.

The stop plate may be actuated by any suitable means, as for example, by the spring weighted crank arm structure 94 (Fig. 2) which at its upper end is connected to the outer end of the stop plate while at its lower end is arranged to engage and be operated by the bell crank lever 23. As the lower arm of lever 94 engages the upper arm of bell crank lever 23, the inward swing of the bell crank lever will cause a clockwise rotation of crank 94, thereby removing the stop from the path of the fruit, and is not returned into fruit engaging position until the bisected peach has passed.

It will be noted that the engaging members 91 reach a short distance above the peach succeeding the peach engaged by the conveyor ring 16 to provide sufficient space or lost motion when this succeeding peach is being moved downwardly to permit the stop plate 93 to be positioned in its path, whereby even though it be of the split pit variety it cannot be conveyed beyond the receiving station.

After the peach under treatment has been cut into halves, these halves are slid along the separator plates 36 and 37 to their respective pitting stations. Here the peach halves are halted long enough for the pitting operation to take place, whereupon the conveyor carries the pitted peach halves across the trimming knives 64.

After leaving the trimming knives, the engaging rings 16 of the conveyor are moved outwardly to release the completed peach-halves. One means for actuating the rings to their open positions includes providing the stop collars 55 with a cam roller 95 which is arranged to engage the stationary outwardly inclined cam surface 96 and as a result thereof the fruit engaging rings will be moved to their retracted positions and there locked by the ratchet and pawl means. The conveyor is now ready for its return journey and upon again reaching the receiving station the conveyor pawls 58 will be actuated to release the engaging rings 16 to take hold of the next peach to be treated.

The machine operates continuously and rapidly requiring only that the attendant keep the magazine loaded with peaches.

An important advantage of providing the automatic feed for the succeeding peach resides in enabling the machine to be operated without the necessity of the attendant coming in close proximity with any of the operating elements of the machine, thus avoiding danger of accidental injury.

It will be understood that the machine is fully enclosed, excepting for the magazine, to further protect the attendant.

Having fully described a preferred embodiment of my invention, it is to be understood that the invention is not to be limited to the details herein set forth, but is of the full scope of the appended claims.

I claim:

1. In a peach treating machine, a plate for supporting the cut surface of a peach-half, said plate having a pitting aperture, an ejector disc supported within said aperture and spaced therefrom to leave a relatively narrow slot, a pitting knife journaled upon said plate and arranged to operate through said slot for cutting the pit from the peach-half, and means for actuating the disc for ejecting the severed pit from the peach half.

2. In a peach treating machine, a magazine arranged to serially support peaches for advancement to a receiving station, a peach conveying means arranged to serially advance the peaches from the receiving station through the machine, and means carried by said conveyor for engaging the succeeding peach while the conveyor is at the receiving station for advancing this peach to the receiving station during the operation of the conveyor.

3. In a peach treating machine, a magazine arranged to serially support peaches for advancement to a receiving station, a peach conveying means arranged to serially advance the peaches from the receiving station through the machine, means carried by said conveyor for engaging the succeeding peach while the conveyor is at the receiving station for advancing this peach to the receiving station during the operation of the conveyor, and means for stopping the movement of this succeeding peach at the receiving station.

4. In a peach pitting machine, a magazine arranged to serially support peaches for advancement to a receiving station, a peach conveying means arranged to serially advance the peaches from the receiving station through the machine, and yieldable means carried by said conveyor for engaging the succeeding peach while the conveyor is at the receiving station for advancing this succeeding peach to said station during the operation of the conveyor.

5. In a peach pitting machine, a magazine arranged to serially support peaches for advancement to a receiving station, a peach conveying means arranged to serially advance the peaches from the receiving station through the machine, yieldable means carried by said conveyor for engaging the succeeding peach while the conveyor is at the receiving station for advancing this succeeding peach to said station during the operation of the conveyor, and means for stopping the movement of this succeeding peach at the receiving station and said means carried by the conveyor yielding to release the peach stopped at the receiving station.

PERCY JEPSON.